US012210673B2

(12) United States Patent
Weng et al.

(10) Patent No.: US 12,210,673 B2
(45) Date of Patent: Jan. 28, 2025

(54) SPATIAL POSITIONING METHOD OF SEPARATE VIRTUAL SYSTEM

(71) Applicant: PIMAX TECHNOLOGY (SHANGHAI) CO., LTD, Shanghai (CN)

(72) Inventors: Zhibin Weng, Shanghai (CN); Ke Zhou, Shanghai (CN); Lei Chen, Shanghai (CN)

(73) Assignee: PIMAX TECHNOLOGY (SHANGHAI) CO., LTD, Shanghai (CN)

(*) Notice: Subject to any disclaimer, the term of this patent is extended or adjusted under 35 U.S.C. 154(b) by 0 days.

(21) Appl. No.: 18/361,455

(22) Filed: Jul. 28, 2023

(65) Prior Publication Data

US 2024/0036637 A1 Feb. 1, 2024

(30) Foreign Application Priority Data

Jul. 29, 2022 (CN) .......................... 202210910072.4

(51) Int. Cl.
*G06F 3/01* (2006.01)
*G01P 15/08* (2006.01)
*G06T 7/73* (2017.01)
*H04N 23/61* (2023.01)

(52) U.S. Cl.
CPC .............. *G06F 3/012* (2013.01); *G01P 15/08* (2013.01); *G06T 7/74* (2017.01); *H04N 23/61* (2023.01); *G06T 2207/30244* (2013.01)

(58) Field of Classification Search
CPC ......... G02B 27/017; G06F 3/012; G06T 7/74; G06T 2207/30244; H04N 23/61; G01P 15/08
USPC ....................................... 345/156, 8
See application file for complete search history.

(56) References Cited

U.S. PATENT DOCUMENTS

| 2019/0025595 | A1* | 1/2019 | Fukuda | G06F 3/0346 |
| 2019/0324279 | A1* | 10/2019 | Hwang | G02B 27/0176 |
| 2020/0043242 | A1* | 2/2020 | Hu | G06F 3/0346 |
| 2020/0110264 | A1* | 4/2020 | Nanasawa | H04N 7/183 |
| 2023/0009683 | A1* | 1/2023 | Biran | H04N 13/293 |

FOREIGN PATENT DOCUMENTS

WO  WO-2021110538 A1 *  6/2021  ........... G06T 19/006

* cited by examiner

Primary Examiner — Jimmy H Nguyen
(74) Attorney, Agent, or Firm — Westbridge IP LLC (57) ABSTRACT

Disclosed are a spatial positioning method of a separate virtual system, and a separate virtual system. The spatial positioning method of the separated virtual system provided by the present application, when the mobile terminal is attached to the virtual head-mounted display device and the mobile terminal performs the virtual mode, the 3DOF is determined from the first image captured by the camera, and the rotational freedom degree is obtained based on the first inertial sensor, so the spatial positioning of the virtual head-mounted display device is determined, and the spatial positioning accuracy of the mobile terminal. In addition, the man-machine interaction based on the spatial positioning enhances the game experience, thereby enhancing the performance of the head-mounted reality device separate from the mobile terminal.

8 Claims, 8 Drawing Sheets

SPATIAL POSITIONING METHOD OF SEPARATE VIRTUAL SYSTEM

CROSS-REFERENCE TO RELATED APPLICATIONS

The present application claims priority to Chinese Patent Application No. 202210910072.4, filed on Jul. 29, 2022, the entire contents of which are incorporated herein by reference for all purposes.

TECHNICAL FIELD

The application relates to the field of virtual technology, in particular to a spatial positioning method of a separate virtual system, and a separate virtual system.

BACKGROUND

At present, a large number of new virtual reality (Virtual Reality, VR) head-mounted display devices composed of a VR box and a mobile terminal have emerged in the market. The performance of the new type of VR head-mounted display device is mainly determined by the performance of the mobile terminal, and its performance is far inferior to the traditional computer-VR head-mounted display device or VR all-in-one machine. The computer-VR head-mounted display device, or the display of the VR all-in-one machine is inseparable from the VR virtual head-mounted display device, and the computer-VR head-mounted display device, or the display of the VR all-in-one machine can only be used together, so the convenience is limited.

However, after the mobile terminal is disassembled, it is necessary to re-position the controller and the virtual head-mounted display device accurately; otherwise smooth man-machine interaction cannot be performed, thereby the gaming experience is affected. At present, there is no method of accurately positioning the separate VR head-mounted display device for the mobile terminal.

SUMMARY

In view of this, the present application provides a spatial positioning method of a separate virtual system, and a separate virtual system, which solves the technical problem in the prior art that the virtual system cannot be set separately and cannot be positioned accurately.

As the first aspect of the present application, the present application provides a spatial positioning method of a separate virtual system, wherein the separate virtual system includes: a virtual head-mounted display device; a mobile terminal, detachably attached to the virtual head-mounted display device; and a controller, in communication connection with the mobile terminal, wherein the mobile terminal is provided with a first inertial sensor, the mobile terminal and/or the virtual head-mounted display device is provided with a camera, and the first inertial sensor is configured to detect IMU data of the mobile terminal; and the spatial positioning method of the separate virtual system includes: when it is determined that the mobile terminal is attached to the virtual head-mounted display device, controlling the camera to capture a first image where the virtual head-mounted display device is; controlling the first inertial sensor to detect the IMU data of the virtual head-mounted display device; calculating the IMU data of the virtual head-mounted display device and the first image to generate the spatial positioning of the virtual head-mounted display device.

In an embodiment of the present application, calculating the IMU data of the virtual head-mounted display device and the first image to generate the spatial positioning of the virtual head-mounted display device includes: determining the 3DOF of the virtual head-mounted display device based on the first image; and determining the spatial positioning of the virtual reality head-mounted display device based on the degree-of-freedom data of the virtual head-mounted display device and the IMU data of the virtual head-mounted display device.

In an embodiment of the present application, determining the 3DOF of the virtual head-mounted display device based on the first image includes: extracting image feature points in the first image, and extracting reference feature points in a reference image; matching the image feature points and the reference feature points to generate effective feature points; based on the effective feature points, extracting the key region from the first image according to Sliding Window Algorithm; generating map points based on the key region, the effective feature points, and a map of the space where the virtual display device is; and determining 3DOF of the virtual display device based on the map points and the map.

In an embodiment of the present application, before extracting the key region from the first image according to Sliding Window Algorithm; the determining the 3DOF of the virtual head-mounted display device based on the first image further includes: judging whether the first image is initialized; when it is determined that the first image is initialized, based on the effective feature points, extracting the key region from the first image according to Sliding Window Algorithm.

In an embodiment of the present application, the determining the 3DOF of the virtual head-mounted display device based on the first image further includes: when it is determined that the first image has not been initialized, relocating the first image according to the map, and determining the positioning state of the first image; the based on the effective feature points, extracting the key region from the first image according to Sliding Window Algorithm includes: based on the positioning state of the first image and the effective feature points, extracting the key region from the first image according to Sliding Window Algorithm.

In an embodiment of the present application, when it is determined that the first image is initialized, based on the effective feature points, extracting the key region from the first image according to Sliding Window Algorithm includes: determining a state of a sliding window in the first image; determining a positioning state of the first image according to the state of the sliding window; sliding the sliding window across the first image according to the positioning state; and detecting an image area marked by the sliding window, and saving a sliding window where the detecting the effective feature points are detected as the key region.

In an embodiment of the present application, the controller is provided with an infrared sensor and a second inertial sensor, and the camera on the mobile terminal is further configured to capture a light-spot image of the infrared sensor; and the spatial positioning method of a separate virtual system further includes: when it is determined that the mobile terminal is attached to the virtual head-mounted display device, controlling the camera to capture the infrared sensor on the controller to form a light-spot image; controlling the second inertial sensor to detect the IMU data of the controller; calculate the spatial positioning of the virtual head-mounted display device, the IMU data of the controller, and the light-spot image to generate the spatial positioning of the controller.

In an embodiment of the present application, when it is determined that the mobile terminal is attached to the virtual head-mounted display device, controlling the camera to capture the environment where the virtual head-mounted display device is located to form a first image includes: when the connector of the mobile terminal is commutated with the connector of the virtual head-mounted display device, controlling the camera to capture the first image where the virtual head-mounted display device is.

As a second aspect of the present application, the present application provides a separate virtual system, comprising: a mobile terminal; a first inertial sensor disposed on the mobile terminal, the first inertial sensor is configured to detect IMU data of the mobile terminal; a virtual head-mounted display device, the mobile terminal is detachably attached to the virtual head-mounted display device; a camera disposed on the mobile terminal and/or the virtual head-mounted display device; a spatial positioning controller of the separate virtual system, the spatial positioning controller is respectively in communication connection with the mobile terminal, the first inertial sensor, and the camera, wherein the spatial positioning controller includes: a function switching unit, configured to switch the function of the mobile terminal to a virtual head-mounted display function when it is determined that the mobile terminal is attached to the virtual head-mounted display device; an imaging control unit, configured to control the camera to capture the environment where the virtual head-mounted display device is located to form a first image; a sensor control unit, configured to control the first inertial sensor to detect the IMU data of the virtual head-mounted display device; and a positioning unit, configured to calculate the IMU data of the virtual head-mounted display device and the first image to generate the spatial positioning of the virtual head-mounted display device.

In an embodiment of the present application, the positioning unit includes: a translational degree-of-freedom determining module, configured to determine the 3DOF of the virtual head-mounted display device based on the first image; and a six degree-of-freedom determining module, configured to determine the 6DOF of the virtual reality head-mounted display device based on the 3DOF of the virtual head-mounted display device and the IMU data of the virtual head-mounted display device, wherein the spatial positioning of the virtual head-mounted display device includes 6DOF of the virtual head-mounted display device.

In an embodiment of the present application, the translational degree-of-freedom determining module includes: a feature determining module, configured to extract image feature points in the first image, and extract reference feature points in a reference image; and match the image feature points and the reference feature points to generate effective feature points; a region extraction module, configured to extract, based on the effective feature points, the key region from the first image according to Sliding Window Algorithm; a map point generation module, configured to generate map points based on the key region, the effective feature points, and the map of the space where the virtual display device is located; and a map information determining module, configured to determine map information of the virtual display device based on the map points and the map, the map information includes the 3DOF.

In an embodiment of the present application, the separate virtual system further includes: an infrared sensor and a second inertial sensor disposed on the controller, the second inertial sensor is configured to measure the IMU data of the controller; the camera on the mobile terminal is also configured to capture the light-spot image of the infrared sensor; and the imaging control unit is also configured to control the camera to capture the infrared sensor on the controller to form a light-spot image; the sensor control unit is further configured to control the second inertial sensor to detect the IMU data of the controller; the positioning unit is further configured to calculate the spatial positioning of the virtual head-mounted display device, the IMU data of the controller and the light-spot image to generate the spatial positioning of the controller.

The spatial positioning method of the separated virtual system provided by the present application, when the mobile terminal is attached to the virtual head-mounted display device and the mobile terminal performs the virtual mode, the translational degree-of-freedom is determined from the first image captured by the camera disposed on the mobile terminal, and the rotational freedom degree is obtained based on the first inertial sensor disposed on the mobile terminal, so that the spatial positioning of the virtual head-mounted display device is determined, so the spatial positioning accuracy of the mobile terminal is enhanced. In addition, the man-machine interaction based on the spatial positioning enhances the game experience, thereby the performance of the head-mounted reality device separate from the mobile terminal can be enhanced.

BRIEF DESCRIPTION OF THE DRAWINGS

The above and other objects, features and advantages of the present application will become more apparent through a more detailed description of the embodiments of the present application in conjunction with the accompanying drawings. The accompanying drawings are used to provide a further understanding of the embodiments of the present application, and constitute a part of the specification, and are used together with the embodiments of the present application to explain the present application, and do not constitute limitations to the present application. In the drawings, the same reference numerals generally represent the same components or steps.

DETAILED DESCRIPTIONS OF THE EMBODIMENTS

In the description of the present application, "plurality" means at least two, such as two, three, etc., unless otherwise specifically defined. All directional indications (such as up, down, left, right, front, back, top, bottom.) in the embodiments of the present application are only used to explain the relationship between the components in a certain posture (as shown in the accompanying drawings) If the specific posture changes, the directional indication will also change accordingly. Furthermore, the terms "include" and "have", as well as any variations thereof, are intended to cover a non-exclusive inclusion. For example, a process, method, system, product or device comprising a series of steps or units is not limited to the listed steps or units, but optionally further includes unlisted steps or units, or optionally further includes for other steps or units inherent in these processes, methods, products or apparatuses.

Additionally, reference herein to "an embodiment" means that a particular feature, structure, or characteristic described in connection with the embodiment may be included in at least one embodiment of the present application. The occurrences of this phrase in various places in the specification are not necessarily all referring to the same embodiment, nor are separate or alternative embodiments mutually exclusive of other embodiments. It is understood explicitly and implicitly by those skilled in the art that the embodiments described herein can be combined with other embodiments.

The following will clearly and completely describe the technical solutions in the embodiments of the application with reference to the drawings in the embodiments of the application. Apparently, the described embodiments are only some, not all, embodiments of the application. Based on the embodiments in this application, all other embodiments obtained by persons of ordinary skill in the art without creative efforts fall within the protection scope of this application.

Figure 1:
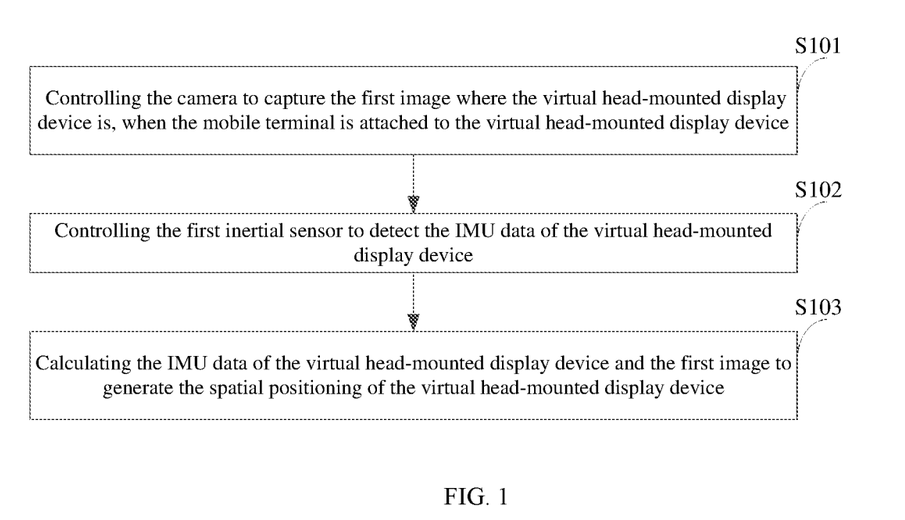
FIG. 1 is a flow diagram of a spatial positioning method of a separate virtual system provided by an embodiment of the present application.

FIG. 1 is a schematic flowchart of a spatial positioning method of a separate virtual system provided by the present application, wherein the separate virtual system includes: a virtual head-mounted display device; a mobile terminal, detachably attached to the virtual head-mounted display device; and a controller, in communication connection with the mobile terminal, wherein the mobile terminal is provided with a first inertial sensor, the mobile terminal and/or the virtual head-mounted display device is provided with a camera, and the first inertial sensor is configured to detect IMU data of the mobile terminal. Specifically, there is one camera and the camera is disposed on the mobile terminal or the virtual head-mounted display device. There are multiple cameras, and the multiple cameras are both disposed on the mobile terminal or on the virtual head-mounted display device. There are multiple cameras, and some of the multiple cameras are disposed on the mobile terminal, and some of the multiple cameras are disposed on the virtual head-mounted display device.

Specifically, an inertial sensor Inertial Measurement Unit (IMU) is an apparatus for measuring the three-axis posture angle (or rotation velocity) and acceleration of an object. Generally, one IMU includes three single-axis accelerometers and three single-axis gyroscopes. The accelerometer detects the acceleration signal of the object on the independent three-axis in the carrier coordinate system, and the gyroscope detects the rotation velocity signal of the carrier relative to the navigation coordinate system. Therefore, the inertial sensor can measure the rotation velocity and acceleration of the object in three-dimensional space, and then calculate the posture of the object, for example, calculate the rotational degree-of-freedom of the object, and the rotational freedom of degree refers to degree-of-freedom related to three positions of up-down, front-back, left and right positions. The IMU data is the result data of the object detected by the inertial sensor, that is, the rotation velocity and acceleration data of an object in three-dimensional space detected by the inertial sensor. Therefore, the first inertial sensor disposed on the controller can detect IMU data of the mobile terminal, and the IMU data of the mobile terminal may be used to calculate the posture of the mobile terminal, such as the rotational degree-of-freedom of the mobile terminal. The rotational degree-of-freedom refers to the degree-of-freedom related to the three positions of up and down, front and rear, and left and right.

As shown in FIG. 1, the spatial positioning method of a separate virtual system includes the following steps:

S101: Controlling the camera to capture the first image where the virtual head-mounted display device is, when the mobile terminal is attached to the virtual head-mounted display device;

Since the virtual head-mounted display device is detachably connected with the mobile terminal, the mobile terminal not only has the virtual head-mounted display function, but also has other functions. For example, the mobile terminal is a smart phone, when the mobile terminal is not attached to the virtual head-mounted display; it can be used as a smart phone, and has the functions that a smart phone should have, such as communication function, display function, etc. When the mobile terminal is attached to the virtual head-mounted display device, the mobile terminal executes the function of the virtual head-mounted display device, and forms a virtual system together with the virtual head-mounted display device and the controller. For example, when the virtual display device is a VR helmet, that is, when the mobile terminal is attached to the VR helmet, the mobile terminal together with the VR helmet and the controller form a VR system.

Specifically, the detachable installation method of the mobile terminal on the virtual head-mounted display device may be as follows: an installation slot is provided on the virtual head-mounted display device, and the mobile terminal is installed in the installation slot, so that the mobile terminal is fixed to the virtual head-mounted display device.

Specifically, the communication connection between the mobile terminal and the controller may be as follows: two ends of the mobile terminal are provided with connection ports for connecting to the controller through a connection line. Understandably, the mobile terminal may also be connected to the controller in a wireless manner such as Bluetooth. After the mobile terminal is successfully attached to the controller, the mobile terminal performs the virtual mode. After performing the virtual mode, the mobile terminal has functions such as game interface display and image processing.

When the mobile terminal is attached to the virtual head-mounted display device, that is, the mobile terminal performs the virtual function, and the mobile terminal and the controller are in a communication connection. That is, the mobile terminal, the controller and the virtual head-mounted display device form a virtual system. When the virtual system works, it needs to locate the mobile terminal and the controller. The camera disposed on the mobile terminal can be controlled to capture images where the virtual head-mounted display device is, so the camera captures the first image where the virtual head-mounted display device is, and the first image is used for spatial positioning of the mobile terminal.

S102: Controlling the first inertial sensor to detect the IMU data of the virtual head-mounted display device;

When the mobile terminal is attached to the virtual head-mounted display device, the mobile terminal, the virtual head-mounted display device and the controller form a virtual system, and the user operates the virtual system to experience the virtual scene. The first inertial sensor is controlled to start working, and the first inertial sensor detects the IMU data of the virtual head-mounted display device under control.

The first inertial sensor disposed on the mobile terminal is controlled to detect the IMU data of the mobile terminal.

Step S103: Calculating the IMU data of the virtual head-mounted display device and the first image to generate the spatial positioning of the virtual head-mounted display device.

After acquiring the first image from the camera and the IMU data from the first inertial sensor, then the spatial positioning of the mobile terminal can be determined according calculating the IMU data and the first image, that is, the spatial positioning is the six degree-of-freedom data (hereinafter referred to as 6DOF) of the mobile terminal. And six degree-of-freedom can be obtained based on the translational degree-of-freedom and the rotational degree-of-freedom.

The spatial positioning method of the separated virtual system provided by the present application, when the mobile terminal is attached to the virtual head-mounted display device and the mobile terminal performs the virtual mode, the rotational freedom degree is obtained from the first image from the camera disposed on the mobile terminal and the first inertial sensor disposed on the mobile terminal, so that the spatial positioning of the virtual head-mounted display device is determined, so the spatial positioning accuracy of the mobile terminal is enhanced. In addition, the man-machine interaction based on the spatial positioning enhances the game experience; thereby the performance of the head-mounted reality device separate from the mobile terminal can be enhanced.

Figure 2:
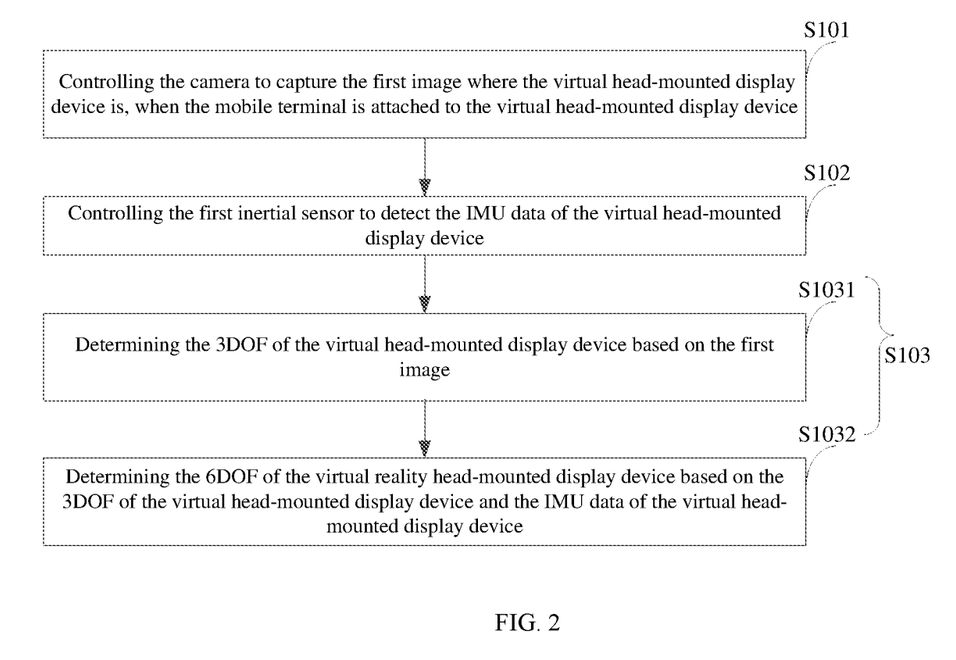
FIG. 2 is a flow diagram of a spatial positioning method of a separate virtual system provided by another embodiment of the present application.

In an embodiment of the present application, FIG. 2 is a schematic flowchart of a spatial positioning method of a separate virtual system provided by another embodiment of the present application. As shown in FIG. 2, Step S103 (Calculating the IMU data of the virtual head-mounted display device and the first image to generate the spatial positioning of the virtual head-mounted display device) specifically includes the following steps:

Step S1031: Determining the 3DOF of the virtual head-mounted display device based on the first image;

The 3DOF refers to the data that the virtual head-mounted display device moves left and right, up and down, and back and forth in space.

Step S1032: Determining the 6DOF of the virtual reality head-mounted display device based on the 3DOF of the virtual head-mounted display device and the IMU data of the virtual head-mounted display device; wherein the spatial positioning of the virtual head-mounted display device is the 6DOF of the virtual head-mounted display device.

The IMU data of the virtual head-mounted display device refers to the rotational IMU data of the virtual head-mounted display device, and the rotational IMU data refers to three rotational degree-of-freedom data of the virtual head-mounted display device. According to the translation IMU data and rotational IMU data of the virtual head-mounted display device, the six degree-of-freedom data (6DOF) of the virtual head-mounted display device can be determined. According to the 6DOF of the virtual head-mounted display device, spatial positioning of the virtual head-mounted display device in space can be accurately tracked. The spatial positioning can accurately map the movement of the virtual head-mounted display device in the real world to the virtual scene.

Figure 3:
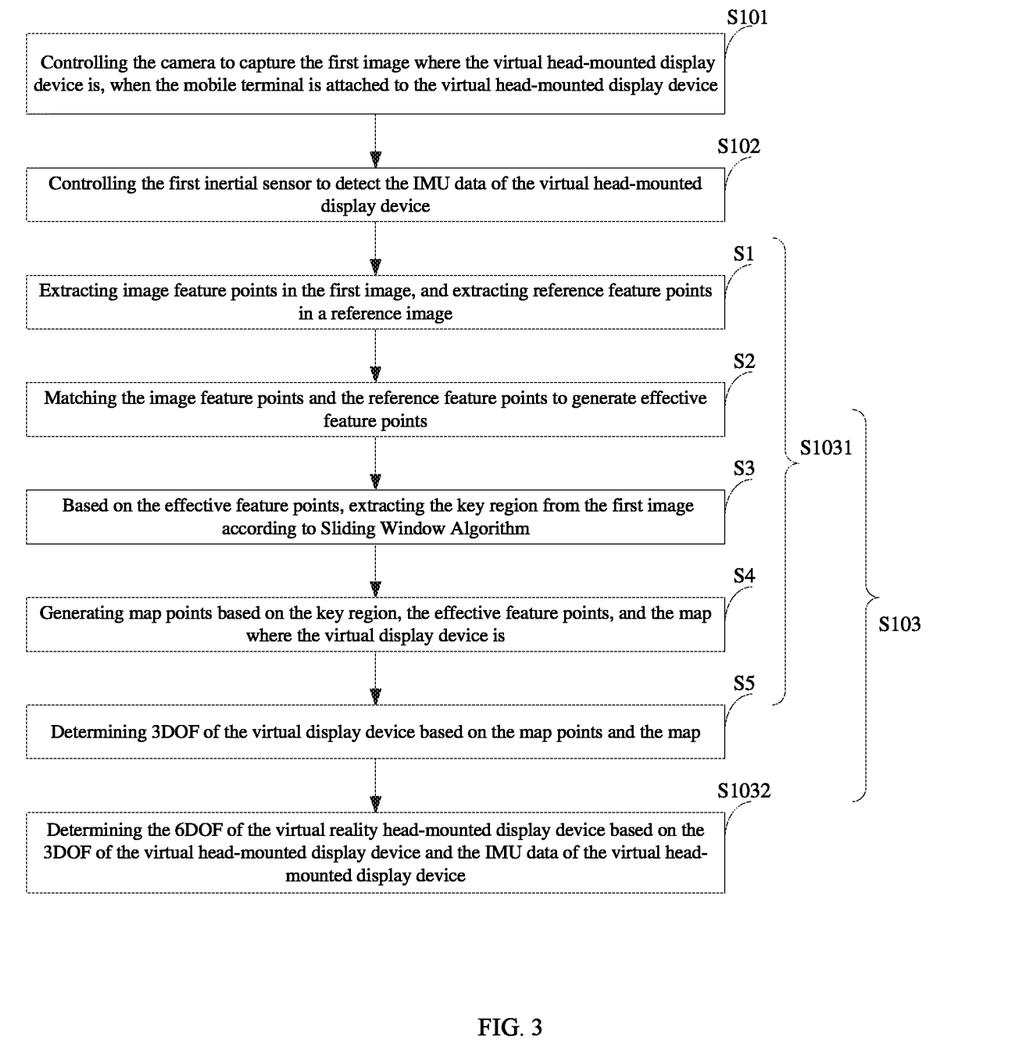
FIG. 3 is a flow diagram of a spatial positioning method of a separate virtual system provided by another embodiment of the present application.

In an embodiment of the present application, FIG. 3 is a schematic flowchart of a positioning method of a combined handle provided by another embodiment of the present application. As shown in FIG. 3, Step S1031 (Determining the 3DOF of the virtual head-mounted display device based on the first image) specifically includes the following steps:

Step S1: Extracting image feature points in the first image, and extracting reference feature points in a reference image;

The reference image refers to a part of the map where the virtual head-mounted display device is. For example, when the virtual head-mounted display device is located in the living room, the map is a map of the living room, and the reference image is a part of the map of the living room, such as an image of a corner of a living room.

Step S2: Matching the image feature points and the reference feature points to generate effective feature points.

The image feature points are matched with the reference feature points, and image feature points matched successfully are effective feature points.

Step S3: Based on the effective feature points, extracting the key region from the first image according to Sliding Window Algorithm.

The Sliding Window Algorithm can prune the search space through the part that slides out from the leftmost side of the sliding window, thereby reducing repeated calculations, and reducing time complexity, and avoiding violent searches.

Step S4: Generating map points based on the key region, the effective feature points, and the map where the virtual display device is.

Step S5: Determining 3DOF of the virtual display device based on the map points and the map.

The present application determines the effective feature points in the first image based on the spatial map and the reference image, and then based on the effective feature points, extracts the key region in the first image according the sliding window method, which can not only enhance the accuracy of the 3DOF, but also reduce the repeated calculations are eliminated, time complexity is reduced, and efficiency is enhanced.

Figure 4:
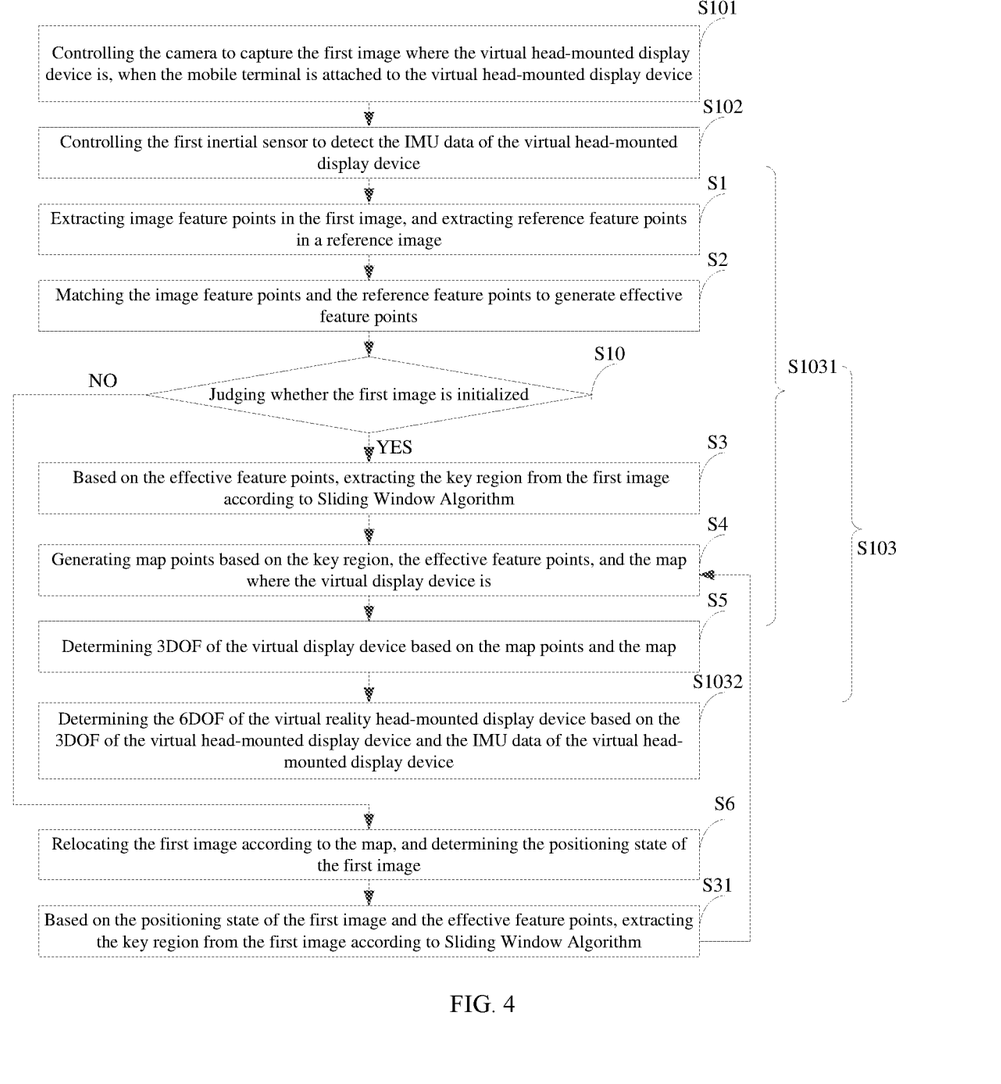
FIG. 4 is a flow diagram of a spatial positioning method of a separate virtual system provided by another embodiment of the present application.

In an embodiment of the present application, FIG. 4 is a schematic flowchart of a spatial positioning method of a separate virtual system provided by another embodiment of the present application. As shown in FIG. 4, before Step S3 (Based on the effective feature points, extracting the key region from the first image according to Sliding Window Algorithm), Step S1031 (Determining the 3DOF of the virtual head-mounted display device based on the first image) further includes the following steps:

Step S10: Judging whether the first image is initialized.

When the judgment result in Step S10 is YES, that is, the first image has been initialized, Step S3 is performed. Based on the effective feature points, the key region is extracted from the first image based on the Sliding Window Algorithm, wherein the first image is initialized image.

Whether the first image is initialized means that whether the brightness, grayscale, and resolution of the first image meet the preset requirements, and image the brightness, grayscale, and resolution meet the preset requirements is determined as the initialization image.

When the judgment result in Step S10 is NO, that is, the first image has not been initialized, at this time, Step S6 is executed.

Step S6: Relocating the first image according to the map, and determining the positioning state of the first image.

Step S3 (Based on the effective feature points, extracting the key region from the first image according to Sliding Window Algorithm) specifically includes: S31: Based on the positioning state of the first image and the effective feature points, extracting the key region from the first image according to Sliding Window Algorithm.

Figure 5:
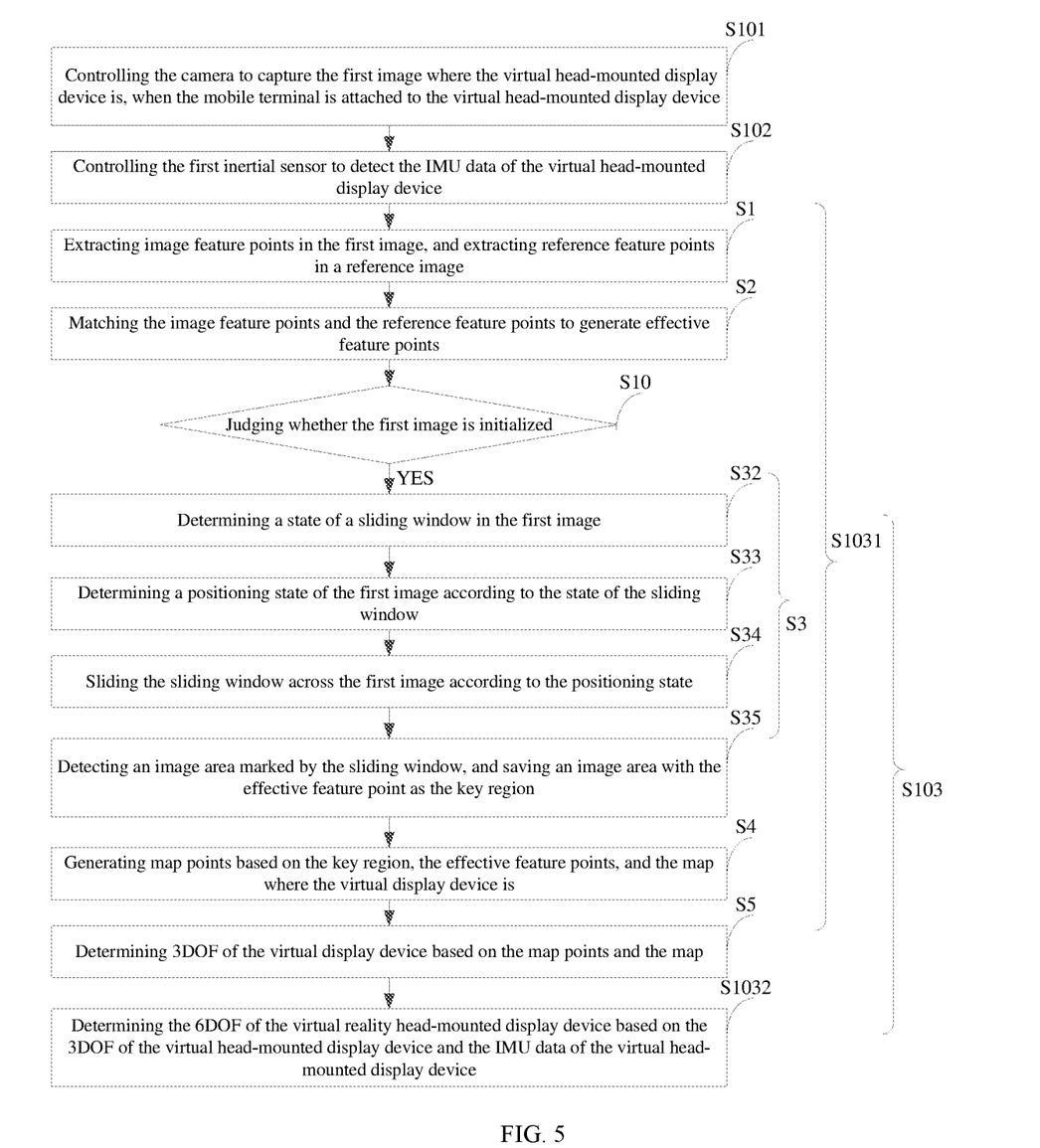
FIG. 5 is a flow diagram of a spatial positioning method of a separate virtual system provided by another embodiment of the present application.

In an embodiment of the present application, FIG. 5 is a schematic flowchart of a positioning method of a combined handle provided by another embodiment of the present application. As shown in FIG. 5, Step S3 (Based on the effective feature points, extracting the key region from the first image according to Sliding Window Algorithm) specifically includes the following steps:

Step S32: Determining a state of a sliding window in the first image;

Step S33: Determining a positioning state of the first image according to the state of the sliding window;

Step S34: Sliding the sliding window across the first image according to the positioning state; and Step S35: Detecting an image area marked by the sliding window, and saving an image area with the effective feature point as the key region.

Figure 6:
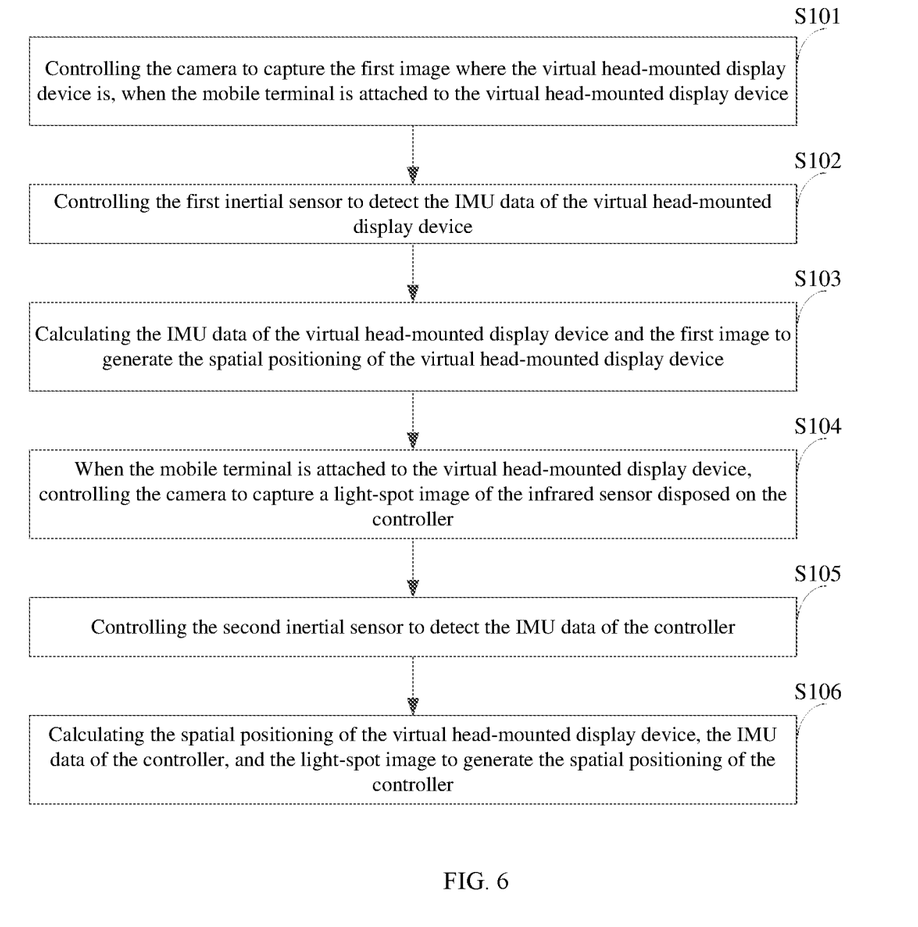
FIG. 6 is a flow diagram of a spatial positioning method of a separate virtual system provided by another embodiment of the present application.

In an embodiment of the present application, the controller is provided with an infrared sensor and a second inertial sensor, and the camera on the mobile terminal is further configured to capture the spot image of the infrared sensor; FIG. 6 is a schematic flowchart of a spatial positioning method of a separate virtual system provided by another embodiment of the present application. As shown in FIG. 6, the spatial positioning method of a separate virtual system further includes:

Step S104: When the mobile terminal is attached to the virtual head-mounted display device, controlling the camera to capture a light-spot image of the infrared sensor disposed on the controller.

When it is determined that the mobile terminal is attached to the virtual head-mounted display device, the controller is in the communication connection with the mobile terminal. The camera disposed on the mobile terminal is controlled to capture a light-spot image of the infrared sensor disposed on the controller.

Step S105: Controlling the second inertial sensor to detect the IMU data of the controller.

When the mobile terminal is attached to the virtual head display device, the controller is in communication connection with the mobile terminal, and the second inertial sensor is controlled to start to work, to detect the IMU data of the controller.

Step S106: calculating the spatial positioning of the virtual head-mounted display device, the IMU data of the controller, and the light-spot image to generate the spatial positioning of the controller.

The spatial positioning of the controller can be realized through steps S104-S106. That is, according the camera on the mobile terminal captures the light-spot image of the infrared sensor on the controller, and the IMU data of the controller detected by the second inertial sensor, the spatial positioning of the controller can be determined.

In an embodiment of the present application, Step S101 (Controlling the camera to capture the first image where the virtual head-mounted display device is, when the mobile terminal is attached to the virtual head-mounted display device) specifically includes the following steps:

Step S1011: Judging whether the connector of the mobile terminal is communicated with the connector of the virtual head-mounted display device.

Specifically, the connector of the mobile terminal and the connector of the virtual head-mounted display device are communication connectors or mechanical connectors.

When the judgment result in Step S1011 is YES, that is, when the connector of the mobile terminal is connected to the connector of the virtual head-mounted display device, it means that the mobile terminal executes the virtual mode, and Step S1012 is executed.

Step S1012: Controlling the camera to capture the first image where the virtual head-mounted display device is.

It should be noted that Step S1011-Step S1012 is a process of judging whether the mobile terminal is communicated with the virtual head-mounted display device. When the mobile terminal is communicated with the virtual head-mounted display device, the mobile terminal performs the virtual mode.

Figure 7:
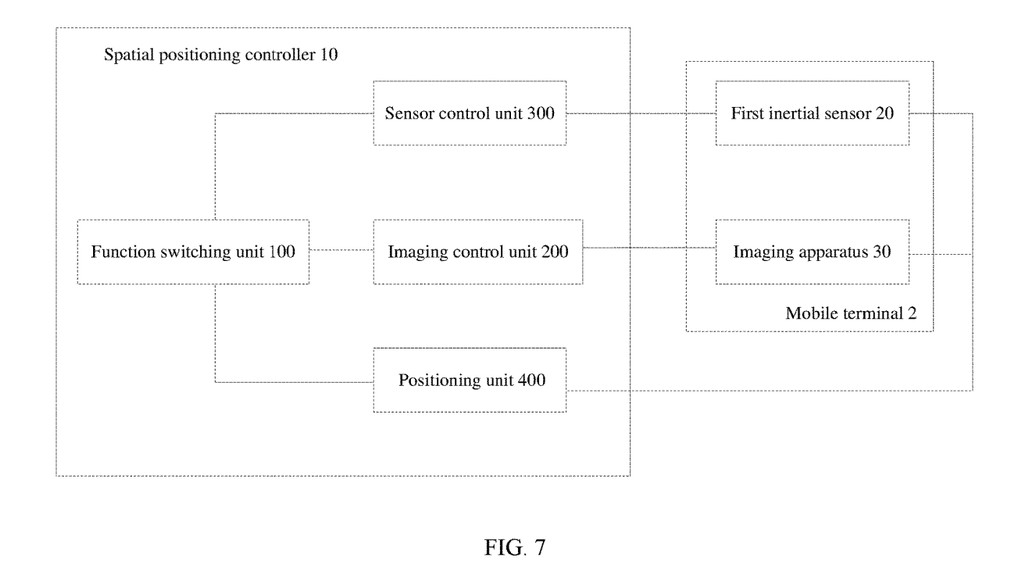
FIG. 7 is a working principle diagram of a separate virtual system provided by an embodiment of the present application.

As a second aspect of the present disclosure, the present disclosure further provides a spatial positioning controller of a separated virtual system, and FIG. 7 is a schematic diagram of a working principle of a separate virtual system provided by an embodiment of the present disclosure; as shown in FIG. 7, the separate virtual system includes:

a mobile terminal 2;

a first inertial sensor 20 and an camera 30 disposed on the mobile terminal, the first inertial sensor 20 is configured to detect the IMU data of the mobile terminal;

a virtual head-mounted display device, the mobile terminal 2 is detachably attached to the virtual head-mounted display device; and a spatial positioning controller 10 of the separate virtual system, the spatial positioning controller 10 is respectively in communication connection with the mobile terminal 2, the first inertial sensor 20, and the camera 30.

Here, the spatial positioning controller 10 includes:

a function switching unit 100, configured to switch the function of the mobile terminal to a virtual head-mounted display function when it is determined that the mobile terminal is attached to the virtual head-mounted display device;

an imaging control unit 200, the imaging control unit 200 is in communication connection with the function switching unit 100. When the function switching unit 100 determines the function of the mobile terminal as a virtual head-mounted display function, the function switching unit 100 transmits a switching signal to the imaging control unit 200 successfully. And the mobile terminal, the virtual head-mounted display device and the controller form a virtual system. When the user uses the virtual system, in order to prepare the spatial positioning of the mobile terminal, the imaging control unit 200 controls the camera 30 to capture a first image where the virtual head-mounted display device is;

a sensor control unit 300, configured to control the first inertial sensor to detect the IMU data of the virtual head-mounted display device. The sensor control unit 300 is in communication connection with the function switching unit 100. When the mobile terminal used as a virtual head-mounted display function, the function switching unit 100 transmits a switching signal to the imaging control unit 200. The mobile terminal, the virtual head-mounted display device and the controller form a virtual system together. When the user uses the virtual system, the sensor control unit 300 controls the first inertial sensor 20 to detect the IMU data of the virtual head-mounted display device, that is, the rotational IMU data.

a positioning unit 400, configured to calculate the IMU data of the virtual head-mounted display device and the first image to generate the spatial positioning of the virtual head-mounted display device.

The positioning unit 400 is in communication connection with the function switching unit 100, the camera 30 and the first inertial sensor 20 respectively, and under the control of the imaging control unit 200, the camera 30 captures a first image where the virtual head-mounted display device is, and the camera 30 sends the first image to the positioning unit 400; the first inertial sensor 20 detects the IMU data of the virtual head-mounted display device under the control of the sensor control unit 300, and sends the IMU data of the virtual head-mounted display device to the positioning unit 400. After receiving the first image and the IMU data of the virtual head-mounted display device, the positioning unit 400 calculates the first image and the IMU data to generate the spatial positioning of the virtual head-mounted display device.

The spatial positioning controller of the separated virtual system provided by the present application, when the mobile terminal is attached to the virtual head-mounted display device and the mobile terminal performs the virtual mode, the controller controls the camera disposed on the mobile terminal to capture the first image where the virtual head-mounted display device is, and controls the first inertial sensor disposed on the mobile terminal to detect the IMU data of the virtual head-mounted display device, and then the spatial positioning of the virtual head-mounted display device is determined, so the spatial positioning accuracy of the mobile terminal is enhanced. In addition, the man-machine interaction based on the spatial positioning enhances the game experience, thereby enhancing the performance of the head-mounted reality device separate from the mobile terminal.

Optionally, the spatial positioning controller 10 is disposed on the mobile terminal. When the spatial positioning controller 10 is disposed on the mobile terminal, the spatial positioning controller 10 can not only realize the spatial positioning of the mobile terminal, but also realize the other spatial positioning when the terminal performs other functions, for example, when the mobile terminal is a mobile phone, the spatial positioning controller 10 can still locate the communication spatial positioning of the mobile phone when the mobile phone performs the communication function. When the mobile terminal and the game handle constitute a game console, the spatial positioning controller 10 can still locate the spatial position of the mobile terminal, so that the user can better experience the game.

Optionally, the spatial positioning controller 10 can also be disposed on a virtual head-mounted display device or a controller.

Figure 8:
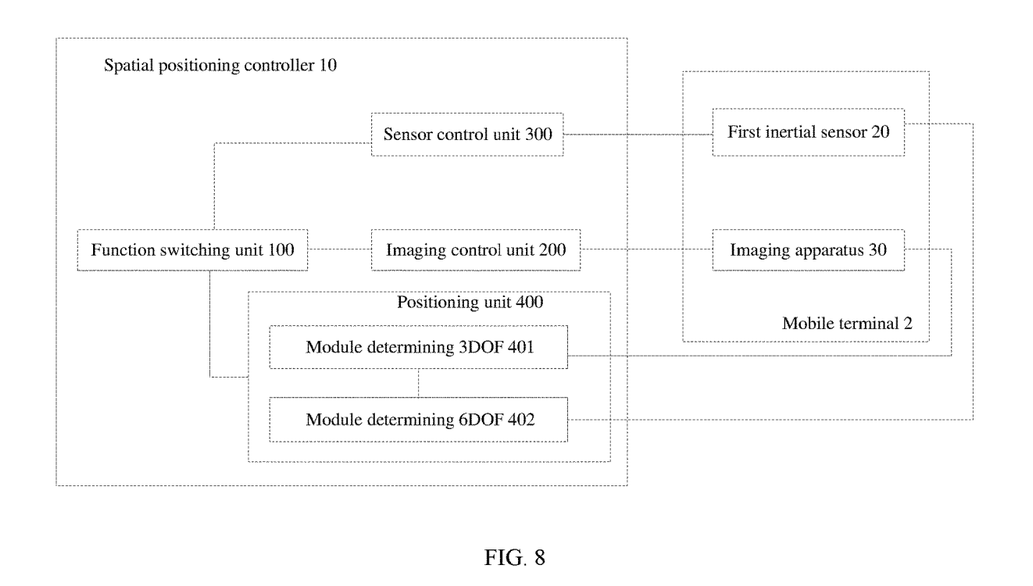
FIG. 8 is a working principle diagram of a separate virtual system provided by another embodiment of the present application.

In an embodiment of the present application, FIG. 8 is a working principle diagram of the positioning controller of the combined handle provided in an embodiment of the present application. As shown in FIG. 8, the spatial positioning unit 400 includes:

a module determining 3DOF 401, configured to determine 3DOF of the virtual head-mounted display device based on the first image;

a module determining 3DOF 401, in communication connection with the camera 30, the camera 30 sends the first image to the module determining 3DOF 401, and the module determining 3DOF 401 determines the 3DOF of the virtual head-mounted display device according to the first image;

a module determining 6DOF 402, configured to determine the 6DOF of the virtual reality head-mounted display device based on the 3DOF of the virtual head-mounted display device and the IMU data of the virtual head-mounted display device; wherein the spatial positioning of the virtual head-mounted display device is the 6DOF of the virtual head-mounted display device;

the six degree-of-freedom determining module 402 is in communication connection with the translational degree-of-freedom module 401 and the first inertial sensor 20 respectively, and the six degree-of-freedom determining module 402 receives the 3DOF from the translational degree-of-freedom determining module 401 and the IMU transmitted by the first inertial sensor 20 data, and calculations IMU data and 3DOF to generate 6DOF of the virtual head-mounted display device.

Figure 9:
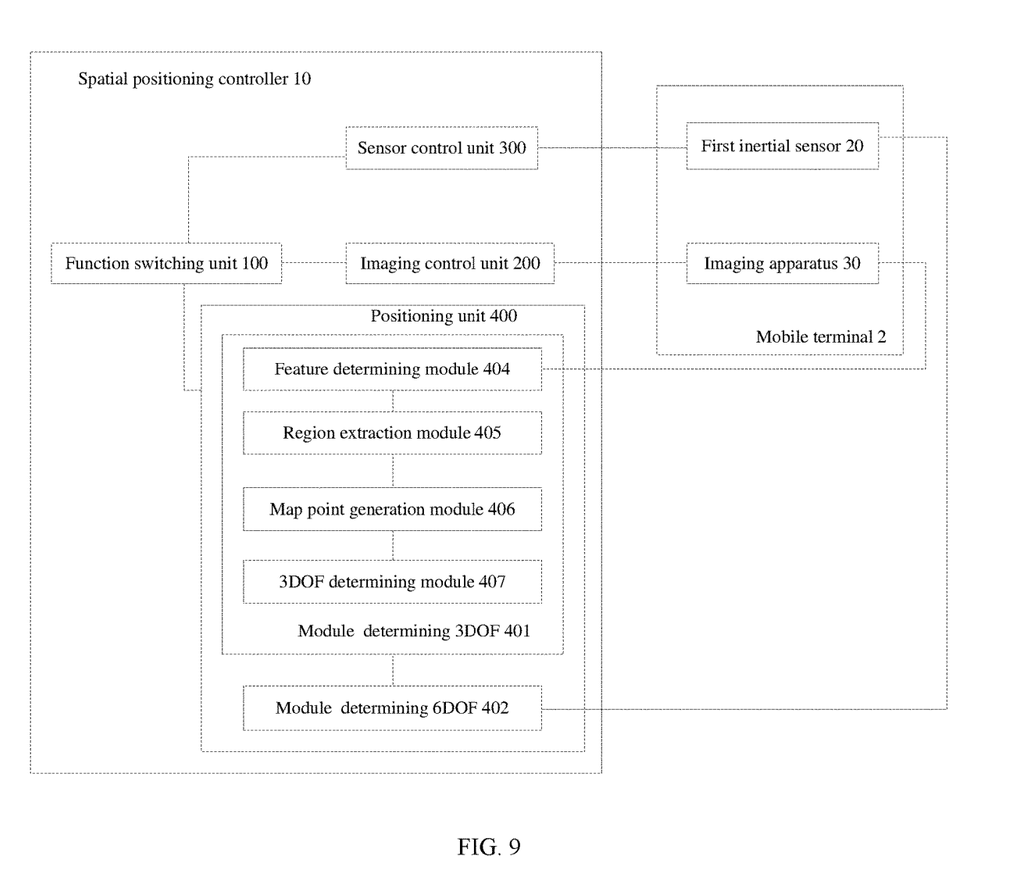
FIG. 9 is a working principle diagram of a separate virtual system provided by another embodiment of the present application.

In an embodiment of the present application, FIG. 9 shows a working principle diagram of a positioning controller for a combined handle provided in an embodiment of the present application. As shown in FIG. 9, the module determining 3DOF 401 includes:

a feature determining module 404, configured to extract image feature points in the first image, and extract reference feature points in a reference image; and match the image feature points and the reference feature points to generate effective feature points;

a region extraction module 405, configured to extract, based on the effective feature points, the key region from the first image according to Sliding Window Algorithm;

a map point generation module 406, configured to generate map points based on the key region, the effective feature points, and the map of the space where the virtual display device is located; and a 3DOF determining module 407, configured to determine 3DOF of the virtual display device based on the map points and the map.

Figure 10:
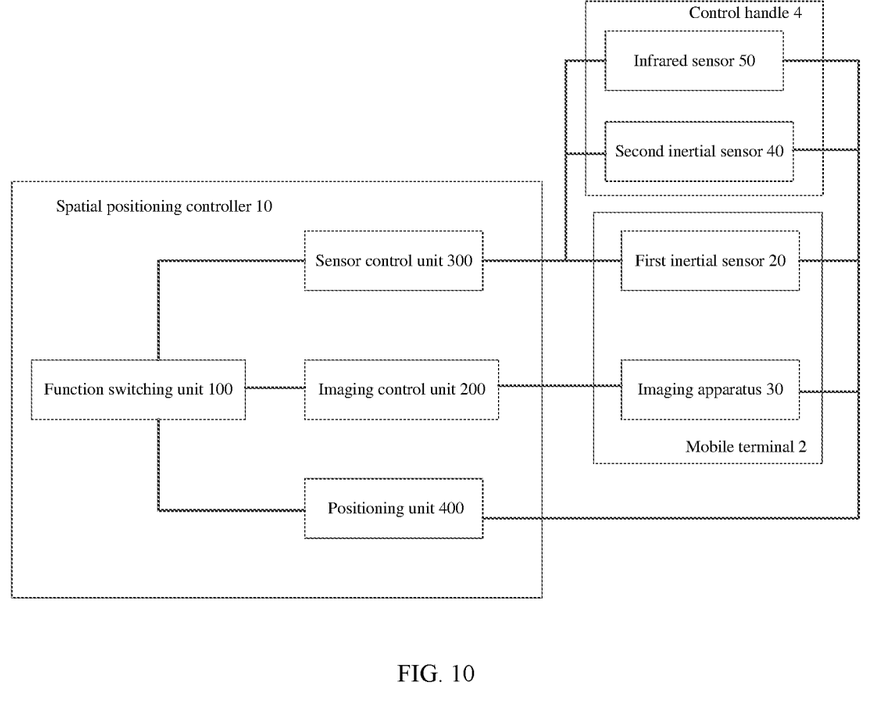
FIG. 10 is a working principle diagram of a separate virtual system provided by another embodiment of the present application.

In an embodiment of the present application, FIG. 10 is a working principle diagram of a separate virtual system provided by another embodiment of the present application;

as shown in FIG. 10, the separate virtual system further includes: a controller 4; an infrared sensor 50 and a second inertial sensor 40 on the controller 4, the camera 30 on the mobile terminal 2 is further configured to capture the light-spot image of the infrared sensor. As shown in FIG. 10, imaging control unit 200 is further configured to control the camera 30 to capture a spot image of the infrared sensor 50 on the controller; the sensor control unit 300 is further configured to control the second inertial sensor 40 to detect the IMU data of the controller 4; the positioning unit 400 is further configured to calculate the spatial positioning of the virtual head-mounted display device, the IMU data of the controller 4 and the light-spot image to generate the spatial positioning of the controller 4. That is, the camera 30 can be controlled to capture the infrared sensor and the second inertial sensor 40 can be controlled to detect the IMU data on the controller 4, so that the spatial positioning of the controller can be determined.

Figure 11:
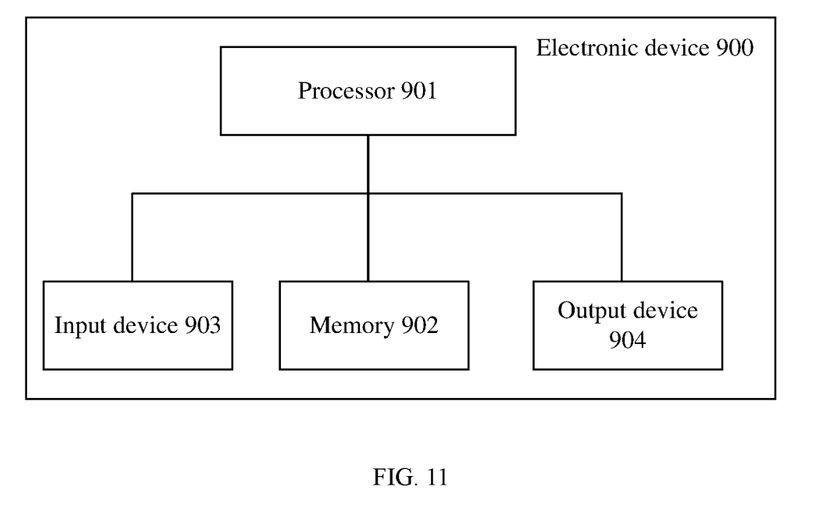
FIG. 11 is a schematic structural diagram of an electronic device provided by an embodiment of the present application.

Next, an electronic device according to an embodiment of the present application will be described with reference to FIG. 11. FIG. 11 is a schematic structural diagram of an electronic device provided by an embodiment of the present application.

As shown in FIG. 11, an electronic device 900 includes one or more processors 901 and memory 902.

The processor 901 may be a central processing unit (CPU) or other forms of processing units having data processing capabilities and/or information execution capabilities, and may control other components in the electronic device 900 to perform desired functions.

Memory 901 may include one or more computer program products, which may include various forms of computer-readable storage media, such as volatile memory and/or non-volatile memory. The volatile memory may include, for example, a random access memory (RAM) and/or a cache memory (cache). The non-volatile memory may include, for example, a read-only memory (ROM), a hard disk, a flash memory, and the like. One or more computer program information can be stored on the computer-readable storage medium, and the processor 901 can run the program information to realize a spatial positioning method of a separate virtual system or other desired functionality in the various embodiments of the present application described above.

In one example, the electronic device 900 may further include: an input device 903 and an output device 904, and these components are connected via a bus system and/or other forms of connection mechanism (not shown).

The input device 903 may include, for example, a keyboard, a mouse, and the like.

The output device 904 can output various information The output device 904 may include, for example, a display, a communication network and remote output devices connected thereto, and the like.

Of course, for the sake of simplicity, only some of the components related to the present application in the electronic device 900 are shown in FIG. 11, and components such as bus, input/output interface, etc. are omitted. In addition, according to specific application conditions, the electronic device 900 may further include any other appropriate components.

In addition to the foregoing method and device, an embodiment of the present application may further be a computer program product, which includes computer program information, and when the computer program information is run by the processor, the processor causes the processor to perform the steps in a spatial positioning method of a separate virtual system described in this specification according to various embodiments of the present application.

The computer program product can be written in any combination of one or more programming languages for executing the program codes for the operations of the embodiments of the present application, and the programming languages include object-oriented programming languages, such as Java, C, etc., further includes conventional procedural programming languages, such as the "C" language or similar programming languages. The program code may be fully executed on a user computing device, or some may be executed on user device as a standalone software package, or some may be executed on a user computing device while some may be executed on a remote computing device, or all the program code may be executed on a remote computing device or a server.

In addition, the embodiments of the present application may also be a computer-readable storage medium, on which computer program information is stored, and the computer program information, when executed by a processor, causes the processor to perform the steps in a spatial positioning method of a separate virtual system described in this specification according to various embodiments of the present application.

The computer readable storage medium may employ any combination of one or more readable media. The readable medium may be a readable signal medium or a readable storage medium. The readable storage medium may include, but not limited to, electronic, magnetic, optical, electromagnetic, infrared, or semiconductor systems, apparatuses, or devices, or any combination thereof. More specific examples (non-exhaustive list) of readable storage media include: communication connection with one or more conductors, portable disk, hard disk, random access memory (RAM), read only memory (ROM), erasable programmable read-only memory (EPROM or flash memory), optical fiber, portable compact disk read-only memory (CD-ROM), optical storage devices, magnetic storage devices, or any suitable combination of the above.

The basic principles of the present application have been described above in conjunction with specific embodiments, but it should be pointed out that the advantages, advantages, effects, etc. mentioned in the present application are only examples rather than limitations, and these advantages, advantages, effects, etc. Every embodiment of the application must have. In addition, the specific details disclosed above are only for the purpose of illustration and understanding, rather than limitation, and the above details do not limit the present application to be implemented by using the above specific details.

The block diagrams of devices, means, apparatuses, and systems involved in the present application are only illustrative examples and are not intended to require or imply that they must be connected, arranged, and configured in the manner shown in the block diagrams. As will be appreciated by those skilled in the art, these devices, devices, devices, systems may be connected, arranged, configured in any manner. Words such as "including", "comprising", "having" and the like are open-ended words meaning "including but not limited to" and may be used interchangeably therewith. As used herein, the words "or" and "and" refer to the word "and/or" and are used interchangeably therewith, unless the context clearly dictates otherwise. As used herein, the word "such as" refers to the phrase "such as but not limited to" and can be used interchangeably therewith.

It should also be pointed out that in the devices, equipment and methods of the present application, each component or each step can be decomposed and/or reassembled. These decompositions and/or recombination should be considered equivalents of this application.

The above description of the disclosed aspects is provided to enable any person skilled in the art to make or use the present application. Various modifications to these aspects will be readily apparent to those skilled in the art, and the generic principles defined herein may be applied to other aspects without departing from the scope of the application. Thus, the present application is not intended to be limited to the aspects shown herein but is to be accorded the widest scope consistent with the principles and novel features of the application herein.

The above is only a preferred embodiment of the application of the application, and is not intended to limit the creation of the application. Any modifications, equivalent replacements, etc. made within the spirit and principles of the application of the application shall be included in the application within the scope of protection created.

What is claimed is:

1. A spatially positioning method of a separate virtual system, wherein the separate virtual system includes: a virtual head-mounted display device; a mobile terminal, detachably attached to the virtual head-mounted display device; and a controller, in communication connection with the mobile terminal, wherein the mobile terminal is provided with a first inertial sensor, the mobile terminal is provided with a camera, and the first inertial sensor is configured to detect Inertial Measurement Unit (IMU) data of the mobile terminal;
    wherein the spatially positioning method, which is implemented by the controller, of the separate virtual system comprises:
    when determining that the mobile terminal is attached to the virtual head-mounted display device, controlling the camera to capture a first image where the virtual head-mounted display device is;
    controlling the first inertial sensor to detect the IMU data of the mobile terminal; and
    calculating the IMU data of the mobile terminal and the first image to generate spatial positioning information of the virtual head-mounted display device.

2. The spatially positioning method according to claim 1, wherein the calculating the IMU data of the mobile terminal and the first image to generate the spatial positioning information of the virtual head-mounted display device comprises:
    determining three-degree-of-freedom (3DOF) of the virtual head-mounted display device based on the first image; and
    determining six degree-of-freedom data (6DOF) of the virtual reality head-mounted display device based on the 3DOF of the virtual head-mounted display device and the IMU data of the virtual head-mounted display device; and
    wherein the spatial positioning information of the virtual head-mounted display device is the 6DOF of the virtual head-mounted display device.

3. The spatially positioning method according to claim 2, wherein the determining the 3DOF of the virtual head-mounted display device based on the first image comprises:
    extracting image feature points in the first image, and extracting reference feature points in a reference image; matching the image feature points and the reference feature points to generate effective feature points;
    based on the effective feature points, extracting a key region from the first image according to Sliding Window Algorithm;
    generating map points based on the key region, the effective feature points, and a map of a space where the virtual head-mounted display device is located; and
    determining the 3DOF of the virtual head-mounted display device based on the map points and the map.

4. The spatially positioning method according to claim 3, wherein before the extracting the key region from the first image according to Sliding Window Algorithm; the determining the 3DOF of the virtual head-mounted display device based on the first image further comprises:
    judging whether the first image is initialized;
    when determining that the first image is initialized, based on the effective feature points, extracting the key region from the first image according to Sliding Window Algorithm.

5. The spatially positioning method according to claim 4, wherein the determining the 3DOF of the virtual head-mounted display device based on the first image further comprises:
    when determining that the first image has not been initialized, relocating the first image according to the map, and determining a positioning state of the first image;
    the based on the effective feature points, extracting the key region from the first image according to Sliding Window Algorithm comprises:
    based on the positioning state of the first image and the effective feature points, extracting the key region from the first image according to Sliding Window Algorithm.

6. The spatially positioning method according to claim 4, wherein when determining that the first image is initialized, based on the effective feature points, extracting the key region from the first image according to Sliding Window Algorithm comprises:
    determining a state of a sliding window in the first image;
    determining a positioning state of the first image according to the state of the sliding window;
    sliding the sliding window across the first image according to the positioning state; and
    detecting an image area marked by the sliding window, and saving an image area with the effective feature point as the key region.

7. The spatially positioning method according to claim 1, wherein the controller is provided with an infrared sensor and a second inertial sensor, and the camera on the mobile terminal is further configured to capture a light-spot image of the infrared sensor; and
    the spatially positioning method of a separate virtual system further comprises:
    when determining that the mobile terminal is attached to the virtual head-mounted display device, controlling the camera to capture the infrared sensor on the controller to form a light-spot image;
    controlling the second inertial sensor to detect IMU data of the controller;
    calculating the spatial positioning of the virtual head-mounted display device, the IMU data of the controller, and the light-spot image to generate spatial positioning information of the controller.

8. The spatially positioning method according to claim 1, wherein when determining that the mobile terminal is attached to the virtual head-mounted display device, the controlling the camera to capture the first image where the virtual head-mounted display device is comprises:

when a connector of the mobile terminal is commutated with a connector of the virtual head-mounted display device, controlling the camera to capture the first image where the virtual head-mounted display device is.

* * * * *